(12) United States Patent
Kuang

(10) Patent No.: US 9,715,824 B2
(45) Date of Patent: Jul. 25, 2017

(54) METHOD AND CONTROL DEVICE FOR SELECTING CONTROLLED DEVICE

(71) Applicant: Huawei Technologies Co., Ltd., Shenzhen (CN)

(72) Inventor: Yunsheng Kuang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/033,092

(22) PCT Filed: Jun. 13, 2014

(86) PCT No.: PCT/CN2014/079826
§ 371 (c)(1),
(2) Date: Apr. 28, 2016

(87) PCT Pub. No.: WO2015/188366
PCT Pub. Date: Dec. 17, 2015

(65) Prior Publication Data
US 2016/0267779 A1    Sep. 15, 2016

(51) Int. Cl.
*G08C 17/02* (2006.01)
*H04B 17/318* (2015.01)
*G08C 25/00* (2006.01)

(52) U.S. Cl.
CPC ............ *G08C 17/02* (2013.01); *G08C 25/00* (2013.01); *H04B 17/318* (2015.01); *G08C 2201/32* (2013.01); *G08C 2201/71* (2013.01)

(58) Field of Classification Search
CPC ......... H04L 12/437; H04L 1/22; H04L 43/00; H04L 45/00; H04L 12/2602; H04L 45/28; H04L 69/40; H04L 12/433
(Continued)

(56) References Cited

U.S. PATENT DOCUMENTS 6,026,304 A    2/2000   Hilsenrath et al.
6,697,350 B2 *  2/2004   Lomp .................. G06F 13/374
                                                        370/342
(Continued)

FOREIGN PATENT DOCUMENTS

CN     102016949 A    4/2011
CN     102239747 A    11/2011
(Continued)

*Primary Examiner* — Mark Blouin
(74) *Attorney, Agent, or Firm* — Leydig, Voit & Mayer, Ltd.

(57) ABSTRACT

The embodiments of the present invention provide a method which includes: acquiring, by a control device, a first signal received strength of data that is received by each controlled device of at least one controlled device in a direct path mode, and a second signal received strength of data that is received by each controlled device of the at least one controlled device in a multipath mode; calculating a ratio of the first signal received strength to the second signal received strength of each controlled device, to obtain a signal received strength ratio of each controlled device; determining, according to the signal received strength ratio of each controlled device and a preset signal received strength ratio corresponding to the controlled device, whether the control device directs to the corresponding controlled device; and determining a target controlled device to which the control device directs, and displaying a control interface of the target controlled device.

14 Claims, 5 Drawing Sheets

(58) Field of Classification Search
USPC .......................................................... 340/2.7
See application file for complete search history.

(56) References Cited

U.S. PATENT DOCUMENTS

| | | | | |
|---|---|---|---|---|
| 7,570,690 | B2 * | 8/2009 | Pietraski | H04L 25/03038 327/311 |
| 7,590,169 | B2 * | 9/2009 | Gaal | H04L 25/03159 375/140 |
| 7,929,498 | B2 * | 4/2011 | Ozluturk | G06F 13/374 370/317 |
| 8,175,191 | B2 * | 5/2012 | Tang | H04W 72/02 375/316 |
| 2005/0225453 | A1 | 10/2005 | Chang et al. | |
| 2009/0285331 | A1 | 11/2009 | Sugar et al. | |
| 2011/0095978 | A1 | 4/2011 | Pehlivan et al. | |
| 2011/0234366 | A1 | 9/2011 | Feng et al. | |

FOREIGN PATENT DOCUMENTS

| | | |
|---|---|---|
| CN | 103713536 A | 4/2014 |
| WO | WO 2009150581 A1 | 12/2009 |

\* cited by examiner

METHOD AND CONTROL DEVICE FOR SELECTING CONTROLLED DEVICE

CROSS-REFERENCE TO RELATED APPLICATION

This application is a National Stage of International Patent Application No. PCT/CN2014/079826, filed on Jun. 13, 2014, which is hereby incorporated by reference in its entirety.

TECHNICAL FIELD

The embodiments of the present invention relates to the field of wireless network applications, and in particular, to a method and a control device for selecting a controlled device.

BACKGROUND

As a quantity and types of household appliances increase and more functions are implemented, control on the household appliances and consumer electronics devices becomes more complex. Generally, dedicated remote controllers are provided for household appliances such as televisions, acoustic equipment, and air conditioners. With increasingly enhanced home intelligence, interactions between household appliances become more popular; therefore, there is a requirement that one control device is used to control all household appliances. However, before devices are controlled, a controlled device first needs to be selected.

Currently, a carrier of a signal used for device control and data transmission includes optical communication and radio electromagnetic wave communication, where a typical optical communication application is the infrared data association (IrDA) technology, which is widely applied to remote controllers of various household appliances. A typical application using the radio electromagnetic wave as a communication medium includes two communications technologies: WiFi and Bluetooth. For selecting a controlled device, the IrDA technology has dominant advantages because of good directivity. However, for the IrDA technology, transmission is performed in a simplex mode, a small amount of information is carried, and a transmission distance is limited. Therefore, the IrDA technology is not applicable to an electronic device having a complex structure and function. Radio electromagnetic wave signals such as Wi-Fi and Bluetooth are not directionally sent or received signals. Therefore, a user needs to select a controlled device by himself or herself, which causes decreased user experience in a case in which there is a relatively large quantity of household appliances.

SUMMARY

Embodiments of the present invention provide a method and a control device for selecting a controlled device, to automatically identify a controlled device to which a control device directs and select a target controlled device.

According to a first aspect, an embodiment of the present invention provides a method for selecting a controlled device, applied to a wireless network that includes one control device and at least one controlled device, where the control device executes the following method:

acquiring a first signal received strength in a direct path mode and a second signal received strength in a multipath mode of each controlled device of the at least one controlled device;

obtaining a signal received strength ratio of each controlled device according to the first signal received strength and the second signal received strength of each controlled device of the at least one controlled device;

determining, according to the signal received strength ratio of each controlled device of the at least one controlled device and a preset signal received strength ratio corresponding to the controlled device, whether the control device directs to the corresponding controlled device; and determining a target controlled device from the controlled device to which the control device directs, and displaying a control interface of the target controlled device on the control device.

According to the first aspect, in a first possible implementation manner of the first aspect, before the acquiring a first signal received strength in a direct path mode and a second signal received strength in a multipath mode of each controlled device of the at least one controlled device, the method further includes: acquiring a current wireless channel environment model of the wireless network; generating, according to the current wireless channel environment model, a tap coefficient in a direct path mode and a tap coefficient in a multipath mode of a channel equalizer of each controlled device of the at least one controlled device in the wireless network; and separately sending the tap coefficient in a direct path mode and the tap coefficient in a multipath mode of the channel equalizer of each controlled device of the at least one controlled device to a corresponding controlled device, so that each controlled device obtains the first signal received strength through calculation according to the tap coefficient in a direct path mode of the channel equalizer of the controlled device and obtains the second signal received strength through calculation according to the tap coefficient in a multipath mode of the channel equalizer of the controlled device.

According to the first aspect or the first possible implementation manner of the first aspect, in a second possible implementation manner of the first aspect, the acquiring a first signal received strength in a direct path mode of each controlled device of the at least one controlled device includes: broadcasting data to the at least one controlled device, and sending a request packet to each controlled device of the at least one controlled device; and receiving a response packet sent by each controlled device of the at least one controlled device, where the response packet includes the first signal received strength of the controlled device.

According to the first aspect or either of the first and second possible implementation manners of the first aspect, in a third possible implementation manner of the first aspect, the acquiring a second signal received strength in a multipath mode of each controlled device of the at least one controlled device includes: broadcasting data to the at least one controlled device, and sending a request packet to each controlled device of the at least one controlled device; and receiving a response packet sent by each controlled device of the at least one controlled device, where the response packet includes the second signal received strength of the controlled device.

According to the first aspect, in a fourth possible implementation manner of the first aspect, the acquiring a first signal received strength in a direct path mode of each controlled device of the at least one controlled device includes: broadcasting data to the at least one controlled device for multiple times; and acquiring multiple signal received strengths corresponding to a direct path mode of each controlled device, and performing weighting processing on the multiple signal received strengths corresponding to the direct path mode of each controlled device, to obtain the first signal received strength; and the acquiring a second signal received strength in a multipath mode of each controlled device of the at least one controlled device includes: broadcasting data to the at least one controlled device for multiple times; and acquiring multiple signal received strengths corresponding to a multipath mode of each controlled device, and performing weighting processing on the multiple signal received strengths corresponding to the direct path mode of each controlled device, to obtain the second signal received strength.

According to the first aspect or any one of the first, second, third, fourth, and fifth possible implementation manners of the first aspect, in a fifth possible implementation manner of the first aspect, the signal received strength ratio of each controlled device is a ratio of the first signal received strength to the second signal received strength of each controlled device of the at least one controlled device; and the determining, according to the signal received strength ratio of each controlled device of the at least one controlled device and a preset signal received strength ratio corresponding to the controlled device, whether the control device directs to the corresponding controlled device includes: if the signal received strength ratio of each controlled device is greater than the preset signal received strength ratio corresponding to the controlled device, determining that the control device directs to the controlled device; otherwise, determining that the control device does not direct to the controlled device; or the signal received strength ratio of each controlled device is a ratio of the second signal received strength to the first signal received strength of each controlled device of the at least one controlled device; and the determining, according to the signal received strength ratio of each controlled device of the at least one controlled device and a preset signal received strength ratio corresponding to the controlled device, whether the control device directs to the corresponding controlled device includes: if the signal received strength ratio of each controlled device is less than the preset signal received strength ratio corresponding to the controlled device, determining that the control device directs to the controlled device; otherwise, determining that the control device does not direct to the controlled device.

According to the first aspect or any one of the first, second, third, fourth, and fifth possible implementation manners of the first aspect, in a sixth possible implementation manner of the first aspect, the determining a target controlled device from the controlled device to which the control device directs includes: if it is determined that the control device directs to only one controlled device, determining that the controlled device that is directed to is the target controlled device; or if it is determined that the control device directs to two controlled devices, sending prompt information to instruct a user to select the target controlled device, and selecting one controlled device from the two controlled devices as the target controlled device according to a processing instruction of the user; or if it is determined that the control device directs to more than two controlled devices, re-executing the method for selecting a controlled device, or sending prompt information to instruct a user to select the target controlled device, and selecting one controlled device from the more than two controlled devices as the target controlled device according to a processing instruction of the user.

According to a second aspect, an embodiment of the present invention provides a control device for selecting a controlled device, applied to a wireless network that includes one control device and at least one controlled device, where the control device includes:

an acquiring unit, configured to acquire a first signal received strength in a direct path mode and a second signal received strength in a multipath mode of each controlled device of the at least one controlled device;

a calculation unit, configured to obtain a signal received strength ratio of each controlled device according to the first signal received strength and the second signal received strength of each controlled device of the at least one controlled device;

a judging unit, configured to determine, according to the signal received strength ratio of each controlled device of the at least one controlled device and a preset signal received strength ratio corresponding to the controlled device, whether the control device directs to the corresponding controlled device; and a determining unit, configured to determine a target controlled device from the controlled device to which the control device directs, and display a control interface of the target controlled device on the control device.

According to the second aspect, in a first possible implementation manner of the second aspect, the control device further includes a generating unit and a sending unit, where the acquiring unit is further configured to acquire a current wireless channel environment model of the wireless network; the generating unit is configured to generate, according to the current wireless channel environment model, a tap coefficient in a direct path mode and a tap coefficient in a multipath mode of a channel equalizer of each controlled device of the at least one controlled device in the wireless network; and the sending unit is configured to separately send the tap coefficient in a direct path mode and the tap coefficient in a multipath mode of the channel equalizer of each controlled device of the at least one controlled device to a corresponding controlled device, so that each controlled device obtains the first signal received strength through calculation according to the tap coefficient in a direct path mode of the channel equalizer of the controlled device and obtains the second signal received strength through calculation according to the tap coefficient in a multipath mode of the channel equalizer of the controlled device.

According to the second aspect or the first possible implementation manner of the second aspect, in a second possible implementation manner of the second aspect, the acquiring unit is specifically configured to broadcast data to the at least one controlled device, and send a request packet to the at least one controlled device; and receive a response packet sent by each controlled device of the at least one controlled device, where the response packet includes the first signal received strength of the controlled device.

According to the second aspect or either of the first and second possible implementation manners of the second aspect, in a third possible implementation manner of the second aspect, the acquiring unit is specifically configured to broadcast data to the at least one controlled device, and send a request packet to the at least one controlled device; and receive a response packet sent by each controlled device of the at least one controlled device, where the response packet includes the second signal received strength of the controlled device.

According to the second aspect, in a fourth possible implementation manner of the second aspect, the acquiring unit is specifically configured to broadcast data to the at least one controlled device for multiple times, acquire multiple signal received strengths corresponding to a direct path mode of each controlled device, and perform weighting processing on the multiple signal received strengths corresponding to the direct path mode of each controlled device, to obtain the first signal received strength; and the acquiring unit is specifically configured to broadcast data to the at least one controlled device for multiple times, acquire multiple signal received strengths corresponding to a multipath mode of each controlled device, and perform weighting processing on the multiple signal received strengths corresponding to the direct path mode of each controlled device, to obtain the second signal received strength.

According to the second aspect or any one of the first, second, third, and fourth possible implementation manners of the second aspect, in a fifth possible implementation manner of the second aspect, the signal received strength ratio of each controlled device is a ratio of the first signal received strength to the second signal received strength of each controlled device of the at least one controlled device; and the judging unit is specifically configured to: if the signal received strength ratio of each controlled device is greater than the preset signal received strength ratio corresponding to the controlled device, determine that the control device directs to the controlled device; otherwise, determine that the control device does not direct to the controlled device;

or the signal received strength ratio of each controlled device is a ratio of the second signal received strength to the first signal received strength of each controlled device of the at least one controlled device; and the judging unit is specifically configured to: if the signal received strength ratio of each controlled device is less than the preset signal received strength ratio corresponding to the controlled device, determine that the control device directs to the controlled device; otherwise, determine that the control device does not direct to the controlled device.

According to the second aspect or any one of the first, second, third, fourth, and fifth possible implementation manners of the second aspect, in a sixth possible implementation manner of the second aspect, the determining unit is specifically configured to: if it is determined that the control device directs to only one controlled device, determine that the controlled device that is directed to is the target controlled device; or if it is determined that the control device directs to two controlled devices, send prompt information to instruct a user to select the target controlled device, and select one controlled device from the two controlled devices as the target controlled device according to a processing instruction of the user; or if it is determined that the control device directs to more than two controlled devices, re-execute the method for selecting a controlled device, or send prompt information to instruct a user to select the target controlled device, and select one controlled device from the more than two controlled devices as the target controlled device according to a processing instruction of the user.

According to a third aspect, an embodiment of the present invention provides a control device for selecting a controlled device, applied to a wireless network that includes one control device and at least one controlled device, where the control device includes a short range wireless communications chip, a central processor, a display component, and an interface, and the short range wireless communications chip communicates with the central processor by using a bus and the interface, where the short range wireless communications chip is configured to acquire a first signal received strength in a direct path mode and a second signal received strength in a multipath mode of each controlled device of the at least one controlled device;

the central processor is configured to obtain a signal received strength ratio of each controlled device according to the first signal received strength and the second signal received strength of each controlled device of the at least one controlled device;

the central processor is configured to determine, according to the signal received strength ratio of each controlled device of the at least one controlled device and a preset signal received strength ratio corresponding to the controlled device, whether the control device directs to the corresponding controlled device;

the central processor is configured to determine a target controlled device from the controlled device to which the control device directs; and the display component is configured to display a control interface of the target controlled device.

According to the third aspect, in a first possible implementation manner of the third aspect, before acquiring the first signal received strength in a direct path mode and the second signal received strength in a multipath mode of each controlled device of the at least one controlled device, the short range wireless communications chip is further configured to acquire a current wireless channel environment model of the wireless network; the central processor is configured to generate, according to the current wireless channel environment model, a tap coefficient in a direct path mode and a tap coefficient in a multipath mode of a channel equalizer of each controlled device of the at least one controlled device in the wireless network; and the short range wireless communications chip is configured to separately send the tap coefficient in a direct path mode and the tap coefficient in a multipath mode of the channel equalizer of each controlled device of the at least one controlled device to a corresponding controlled device, so that each controlled device obtains the first signal received strength through calculation according to the tap coefficient in a direct path mode of the channel equalizer of the controlled device and obtains the second signal received strength through calculation according to the tap coefficient in a multipath mode of the channel equalizer of the controlled device.

According to the third aspect or the first possible implementation manner of the third aspect, in a second possible implementation manner of the third aspect, that the short range wireless communications chip is configured to acquire a first signal received strength in a direct path mode of each controlled device of the at least one controlled device includes: the short range wireless communications chip is configured to broadcast data to the at least one controlled device, send a request packet to the at least one controlled device, and receive a response packet sent by each controlled device of the at least one controlled device, where the response packet includes the first signal received strength of the controlled device.

According to the third aspect or either of the first and second possible implementation manners of the third aspect, in a third possible implementation manner of the third aspect, that the short range wireless communications chip is configured to acquire a second signal received strength in a multipath mode of each controlled device of the at least one controlled device includes: the short range wireless communications chip is configured to broadcast data to the at least one controlled device, send a request packet to the at least one controlled device, and receive a response packet sent by each controlled device of the at least one controlled device, where the response packet includes the second signal received strength of the controlled device.

According to the third aspect, in a fourth possible implementation manner of the third aspect, that the short range wireless communications chip is configured to acquire a first signal received strength in a direct path mode of each controlled device of the at least one controlled device includes: the short range wireless communications chip is configured to broadcast data to the at least one controlled device for multiple times, acquire multiple signal received strengths corresponding to a direct path mode of each controlled device, and perform weighting processing on the multiple signal received strengths corresponding to the direct path mode of each controlled device, to obtain the first signal received strength; and that the short range wireless communications chip is configured to acquire a second signal received strength in a multipath mode of each controlled device of the at least one controlled device includes: the short range wireless communications chip is configured to broadcast data to the at least one controlled device for multiple times, acquire multiple signal received strengths corresponding to a multipath mode of each controlled device, and perform weighting processing on the multiple signal received strengths corresponding to the multipath mode of each controlled device, to obtain the second signal received strength.

According to the third aspect or any one of the first, second, third, and fourth possible implementation manners of the third aspect, in a fifth possible implementation manner of the third aspect, the signal received strength ratio of each controlled device is a ratio of the first signal received strength to the second signal received strength of each controlled device of the at least one controlled device; and that the central processor is configured to determine, according to the signal received strength ratio of each controlled device of the at least one controlled device and a preset signal received strength ratio corresponding to the controlled device, whether the control device directs to the corresponding controlled device includes: if the signal received strength ratio of each controlled device is greater than the preset signal received strength ratio corresponding to the controlled device, determining that the control device directs to the controlled device; otherwise, determining that the control device does not direct to the controlled device; or the signal received strength ratio of each controlled device is a ratio of the second signal received strength to the first signal received strength of each controlled device of the at least one controlled device; and that the central processor is configured to determine, according to the signal received strength ratio of each controlled device of the at least one controlled device and a preset signal received strength ratio corresponding to the controlled device, whether the control device directs to the corresponding controlled device includes: if the signal received strength ratio of each controlled device is less than the preset signal received strength ratio corresponding to the controlled device, determining that the control device directs to the controlled device; otherwise, determining that the control device does not direct to the controlled device.

According to the third aspect or any one of the first, second, third, fourth, and fifth possible implementation manners of the third aspect, in a sixth possible implementation manner of the third aspect, that the central processor is configured to determine a target controlled device from the controlled device to which the control device directs includes: if it is determined that the control device directs to only one controlled device, determining that the controlled device that is directed to is the target controlled device; or if it is determined that the control device directs to two controlled devices, sending prompt information to instruct a user to select the target controlled device, and selecting one controlled device from the two controlled devices as the target controlled device according to a processing instruction of the user; or if it is determined that the control device directs to more than two controlled devices, re-executing the method for selecting a controlled device, or sending prompt information to instruct a user to select the target controlled device, and selecting one controlled device from the more than two controlled devices as the target controlled device according to a processing instruction of the user.

In the method and control device for selecting a controlled device that are provided in the embodiments of the present invention, the control device acquires a first signal received strength in a direct path mode and a second signal received strength in a multipath mode of each controlled device of at least one controlled device; obtains a signal received strength ratio of each controlled device according to the first signal received strength and the second signal received strength of each controlled device of the at least one controlled device; determines, according to the signal received strength ratio of each controlled device of the at least one controlled device and a preset signal received strength ratio corresponding to the controlled device, whether the control device directs to the corresponding controlled device; and determines a target controlled device from the controlled device to which the control device directs, and displays a control interface of the target controlled device on the control device. Therefore, one control device may automatically identify, based on a short range wireless communication technology, a controlled device to which the control device directs, and select a target controlled device.

DESCRIPTION OF EMBODIMENTS

Figure 1:
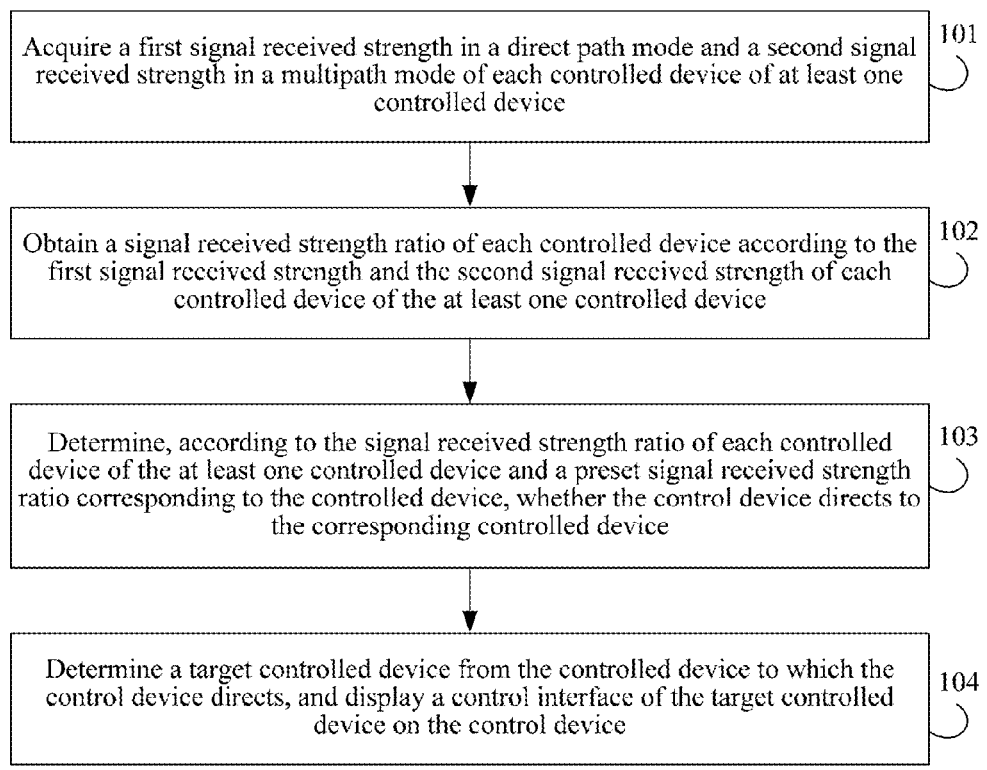
FIG. 1 is a flowchart of a method for selecting a controlled device according to an embodiment of the present invention.

To provide thorough understanding of the present invention, the following further describes the embodiments of the present invention in detail with reference to the accompanying drawings. The foregoing embodiments are not intended to limit the protection scope of the present invention.

A specific application scenario of the technical solutions provided in the embodiments of the present invention is an indoor environment, for example, a household indoor environment. One control device and multiple controlled devices may be arranged indoors, where both the control device and the controlled devices are provided with short range wireless communications transceiver modules, to support transmission and processing of short range wireless signals. The control device used as a master device and controlled devices used as slave devices form a wireless network. The control device may be a universal remote controller or a smart terminal (for example, a smart phone or a tablet computer), a user controls a controlled device in the same wireless network, and the controlled device may be a television, a set top box, an air conditioner, a digital versatile disc (DVD) player, acoustic equipment, or the like. In this application, a short range communication antenna of the control device is a directional antenna, and a main lobe direction of the antenna is a front-end directed direction (that is, a directed direction) of the control device. A short range communication antenna of the controlled device is an omi-directional antenna. The short range wireless communications transceiver modules of the control device and the controlled device are provided with channel equalizers and tap coefficients of the channel equalizers may be configured. Each controlled device of at least one controlled device already transmits a data model of respective control instruction to the control device and generates a control interface on the control device.

In this application, the short range wireless communication is not limited to a specific wireless communications technology, and may include Bluetooth, Wi-Fi Direct, the Radio Frequency for Consumer Electronics (RF4CE) technology, the ultra-wideband (UWB) technology, the Zigbee technology, the home radio frequency (HomeRF) technology, and the like.

It should be noted that, when the control device emits a short range wireless signal, a channel model when the control device directs to a controlled device is different from a channel model when the control device does not direct to a controlled device. When a remote controller directs to the controlled device, a signal of a direct path component has the largest strength and a signal of a multipath component has a relatively small strength. When the remote controller does not direct to the controlled device, because signals are reflected and blocked by objects such as walls, floors, or household appliances, when the strength of the received signal of the direct path component is not large, and even there is no direct path component, most of received signal strengths come from signals of multipath components. Therefore, this difference may be used to distinguish whether the control device directs to the controlled device.

FIG. 1 is a flowchart of a method for selecting a controlled device according to an embodiment of the present invention. The technical solution provided in this embodiment is applied to a wireless network that includes one control device and at least one controlled device. Specifically, as shown in FIG. 1, this embodiment includes the following executed method:

Step 101: The control device acquires a first signal received strength in a direct path mode and a second signal received strength in a multipath mode of each controlled device of the at least one controlled device.

To implement the technical solutions of the embodiments of the present invention, in a process of actually constructing the wireless network, the control device may also acquire a current wireless channel environment model, and generates, according to the current wireless channel environment model, a tap coefficient in a direct path mode and a tap coefficient in a multipath mode of a channel equalizer of each controlled device of the at least one controlled device.

The current wireless channel environment model may be acquired by using a channel estimation algorithm such as reference signal estimation, maximum likelihood estimation, or blind estimation, and a specific implementation manner does not constitute a limitation on the present invention. After generating the tap coefficient of each controlled device, the control device may separately send the tap coefficient in a direct path mode and the tap coefficient in a multipath mode of the channel equalizer of each controlled device of the at least one controlled device to the corresponding controlled device.

Optionally, in a direct path mode, a tap coefficient of a direct path component occupies the largest weight, where a weight value is far greater than that of a tap coefficient of a multipath component; and in a multipath mode, a tap coefficient of a direct path component occupies a relatively small weight, or a weight thereof is zero, and a tap coefficient of a multipath component is relatively large. Specific weight allocation between tap coefficients may be set according to an indoor wireless channel environment model, where the wireless channel environment model includes a multipath fading channel model, a Rayleigh channel fading model caused by noise, and an interference model of another ISM frequency band noise. The wireless channel environment is related to placement positions of indoor electronics devices, placement positions of indoor furniture, layout of the room, and a radio interference status of the cell, and is time variant. Wireless channel environments corresponding to different rooms are different. The tap coefficient of the channel equalizer may be specifically set by using a channel equalization algorithm such as zero forcing, minimum mean square error, or Kalman filter, and a specific implementation manner does not constitute a limitation on the present invention.

In a configuration process, for different controlled devices, the control device may set a same tap coefficient in a direct path mode and a same tap coefficient in a multipath mode of the channel equalizer, or may set different tap coefficients of the channel equalizers.

After the control device completes setting the tap coefficient of the channel equalizer of each controlled device, the control device may separately send the tap coefficient to the corresponding controlled device. The control device may send the tap coefficient in a direct path mode of the controlled device to the controlled device by using a first configuration packet, so that the controlled device obtains the first signal received strength through calculation according to the tap coefficient in a direct path mode of the channel equalizer. The control device may send the tap coefficient in a multipath mode of the controlled device to the controlled device by using a second configuration packet, so that the controlled device obtains the second signal received strength through calculation according to the tap coefficient in a multipath mode of the channel equalizer.

The process of acquiring a first signal received strength in a direct path mode of each controlled device of the at least one controlled device may include: broadcasting data to the at least one controlled device and separately sending a request packet to the at least one controlled device, where the request packet is used to instruct the controlled device to read a signal received strength of the controlled device and feed back the signal received strength to the control device; and receiving a response packet sent by the at least one controlled device, where the response packet includes the first signal received strength of the controlled device. The first signal received strength mentioned herein is used to characterize a value of a strength of a signal obtained after the controlled device processes, within unit time by using an equalizer for which a tap coefficient in a direct path mode is set, an electromagnetic signal received by an antenna, where a measurement index may be a signal power, a signal maximum amplitude value, a signal peak-peak value, or the like.

Optionally, the control device configures the tap coefficient in a direct path mode as the tap coefficient of the channel equalizer of the controlled device in the wireless network and sends the tap coefficient to each controlled device of the at least one controlled device according to a configured transceiving timeslot. After receiving a tap coefficient configuration packet of the channel equalizer, each controlled device configures the tap coefficient of the channel equalizer to a tap coefficient, specified by the control device, in a direct path mode. After completing the configuration, the control device broadcasts data to each controlled device, where the data is mainly used to detect a strength of a signal received by the controlled device. Meanwhile, the control device sends a request packet to each controlled device and reads a received signal strength of the data received by the controlled device. For a controlled device i, after receiving the request packet sent by the control device, the controlled device sends a signal strength $I_{Di}$ of the received data to the control device.

The process of acquiring a second signal received strength in a multipath mode of each controlled device of the at least one controlled device may include: broadcasting data to the at least one controlled device and separately sending a request packet to the at least one controlled device, where the request packet is used to instruct the controlled device to read a signal received strength of the controlled device and feed back the signal received strength to the control device; and receiving a response packet sent by the at least one controlled device, where the response packet includes the second signal received strength of the controlled device. The second signal received strength mentioned herein is used to characterize a value of a strength of a signal obtained after the controlled device processes, within unit time by using an equalizer for which a tap coefficient in a multipath mode is set, an electromagnetic signal received by an antenna, where a measurement index may be a signal power, a signal maximum amplitude value, a signal peak-peak value, or the like. It should be noted that the measurement index of the second signal received strength should be the same as the measurement index of the first signal received strength.

The control device configures the tap coefficient in a multipath mode as the tap coefficient of the channel equalizer of the controlled device in the wireless network and sends the tap coefficient to each controlled device of the at least one controlled device according to a configured transceiving timeslot. After receiving the tap coefficient configuration packet of the channel equalizer, each controlled device configures the tap coefficient of the channel equalizer to a tap coefficient, specified by the control device, in a multipath mode. After completing the configuration, the control device broadcasts data to each controlled device, where the data is mainly used to detect a strength of a received signal. Meanwhile, the control device sends a request packet to each controlled device and reads a received signal strength indication generated when the controlled device receives the data. For the controlled device i, after receiving the request packet sent by the control device, the controlled device sends a signal strength $I_{Mi}$ of the received data to the control device.

Optionally, the acquiring a first signal received strength in a direct path mode of each controlled device of the at least one controlled device includes: broadcasting data to the at least one controlled device for multiple times, acquiring multiple signal received strengths corresponding to a direct path mode of each controlled device, and performing weighting processing on the multiple signal received strengths corresponding to the direct path mode of each controlled device, to obtain the first signal received strength. The acquiring a second signal received strength, in a multipath mode, of each controlled device specifically includes: broadcasting data to the at least one controlled device for multiple times, acquiring multiple signal received strengths corresponding to a multipath mode of each controlled device, and performing weighting processing on the multiple signal received strengths corresponding to the direct path mode of each controlled device, to obtain the second signal received strength.

That is, the control device may repeat the foregoing operations, and after acquiring multiple sets of $I_{Di}$ and $I_{Mi}$ data corresponding to each controlled device, perform weighted averaging processing on the data; therefore, it may be avoided that an error of test data is relatively large during testing due to random mutation of a channel, intensive noise interference, or the like, thereby improving reliability of the test data. After the weighted averaging processing, the final first signal received strength $I_{Di}$ and second signal received strength $I_{Mi}$ are obtained.

Step 102: The control device obtains a signal received strength ratio of each controlled device according to the first signal received strength and the second signal received strength of each controlled device of the at least one controlled device.

For the controlled device i, the signal received strength ratio may be defined in two manners. First is: the signal received strength ratio is a ratio of the first signal received strength $I_{Di}$ to the second signal received strength $I_{Mi}$ of the controlled device i, that is, the signal received strength ratio of the controlled device i is $$D'_i = \frac{I_{Di}}{I_{Mi}};$$

the other is: the signal received strength ratio is a ratio of the second signal received strength $I_{Mi}$ to the first signal received strength $I_{Di}$ of the controlled device i, that is, the signal received strength ratio of the controlled device i is $$D'_i = \frac{I_{Mi}}{I_{Di}}.$$

Which manner is used may be autonomously determined by a user or a developer, but only one definition manner is used in one actual case.

The control device may set a preset signal received strength ratio of the controlled device according to the tap coefficient in a direct path mode and the tap coefficient in a multipath mode of the channel equalizer that are configured for the controlled device i. Same as the definition of the signal received strength ratio of the controlled device i, the preset signal received strength ratio of the controlled device i may also have two definition manners. Generally, for the tap coefficient in a direct path mode of the channel equalizer, a tap coefficient corresponding to a direct path component is far greater than a tap coefficient corresponding to a multipath component, and the tap coefficient of the multipath component is generally very small and even is zero; for a multipath mode, a tap coefficient corresponding to a multipath component is far greater than a tap coefficient corresponding to a direct path component, and the tap coefficient of the direct path component is generally very small and even is zero. Therefore, if the first definition manner is used, the preset signal strength ratio $D_i$ is in direct proportion to a difference between the tap coefficient of the direct path component in a direct path mode and the tap coefficient of the direct path component in a multipath mode, where a larger difference indicates a larger value of the preset signal strength ratio $D_i$. Similarly, if the second definition manner is used, the preset signal strength ratio $D_i$ is in inverse proportion to a difference between the tap coefficient of the direct path component in a direct path mode and the tap coefficient of the direct path component in a multipath mode, where a larger difference indicates a smaller value of the preset signal strength ratio $D_i$.

Step 103: The control device determines, according to the signal received strength ratio of each controlled device of the at least one controlled device and a preset signal received strength ratio corresponding to the controlled device, whether the control device directs to the corresponding controlled device.

For each controlled device i, the preset signal received strength ratio is compared with the signal received strength ratio calculated in step 102. For the first definition manner in step 102, if the signal received strength ratio is greater than the preset signal received strength ratio, it is determined that the control device directs to the controlled device i; if the signal received strength ratio is less than the preset signal received strength ratio, it is determined that the control device does not direct to the controlled device i; if the signal received strength ratio is equal to the preset signal received strength ratio, it may be determined that the control device directs to the controlled device i, or it may be determined that the control device does not direct to the controlled device i, which may be set according to actual needs. For the second definition manner in step 102, if the signal received strength ratio is less than the preset signal received strength ratio, it is determined that the control device directs to the controlled device i; if the signal received strength ratio is greater than the preset signal received strength ratio, it is determined that the control device does not direct to the controlled device i; if the signal received strength ratio is equal to the preset signal received strength ratio, it may be determined that the control device directs to the controlled device i, or it may be determined that the control device does not direct to the controlled device i, which may be set according to actual needs.

Step 104: Determine a target controlled device from the controlled device to which the control device directs, and display a control interface of the target controlled device on the control device.

According to the comparison result in step 103, the determining a target controlled device from the controlled device to which the control device directs includes: if it is determined that the control device directs to only one controlled device, determining that the controlled device that is directed to is the target controlled device; or if it is determined that the control device directs to two controlled devices, sending prompt information to instruct a user to select the target controlled device, and selecting one controlled device from the two controlled devices as the target controlled device according to a processing instruction of the user; or if it is determined that the control device directs to more than two controlled devices, re-executing the method for selecting a controlled device, or sending prompt information to instruct a user to select the target controlled device, and selecting one controlled device from the more than two controlled devices as the target controlled device according to a processing instruction of the user.

When it is determined that the control device directs to only one controlled device, the control device may enable the control interface of the target controlled device to pop up automatically, so that the user performs a corresponding control operation on the controlled device.

When it is determined that the control device directs to two controlled devices, for example, it is determined that the control device directs to a set top box and a television at the same time, the control device may send prompt information to instruct the user to select the target controlled device, where a prompt manner may be prompting the user in a manner of displaying an operation interface on a display component of the control device, or may be prompting the user in a manner that the control device plays a voice, displays a text, displays an image, or the like, and the user chooses, according to the prompt, to control a controlled device. The control device may generate a corresponding processing instruction according to an operation of the user, select a corresponding controlled device as the target controlled device according to the processing instruction, and enable the control interface of the current controlled device to pop up automatically, so that the user performs a corresponding control operation on the controlled device. In addition, besides sending the prompt information to instruct the user to select the target controlled device, the control device may also automatically select a target controlled device according to a priority of each controlled device, a preference of the user, a use habit of the user, or the like.

If it is determined in step 103 that the control device directs to more than two controlled devices, it may indicate that selection of a controlled device fails, and the foregoing method for selecting a controlled device is re-executed, or the prompt information may be sent to instruct the user to select the target controlled device, and the user selects one, from the controlled device that is directed to, as the target controlled device. Which manner of selecting a target controlled device is used may be determined by the user or the developer.

Therefore, in this embodiment of the present invention, it is implemented that one control device may determine, according to a received strength of a signal transmitted back by a controlled device, whether the control device directs to the controlled device. According to an operation habit of controlling, by people, a device by using a remote controller, when a user directs the control device to a controlled device, it represents that the user wants to control the controlled device; therefore, in this embodiment of the present invention, by means of determining whether the control device directs to the controlled device, a device that the user wants to control is identified based on the short range wireless communications technology, and a target controlled device is selected from multiple controlled devices, thereby improving user experience effect.

Figure 2:
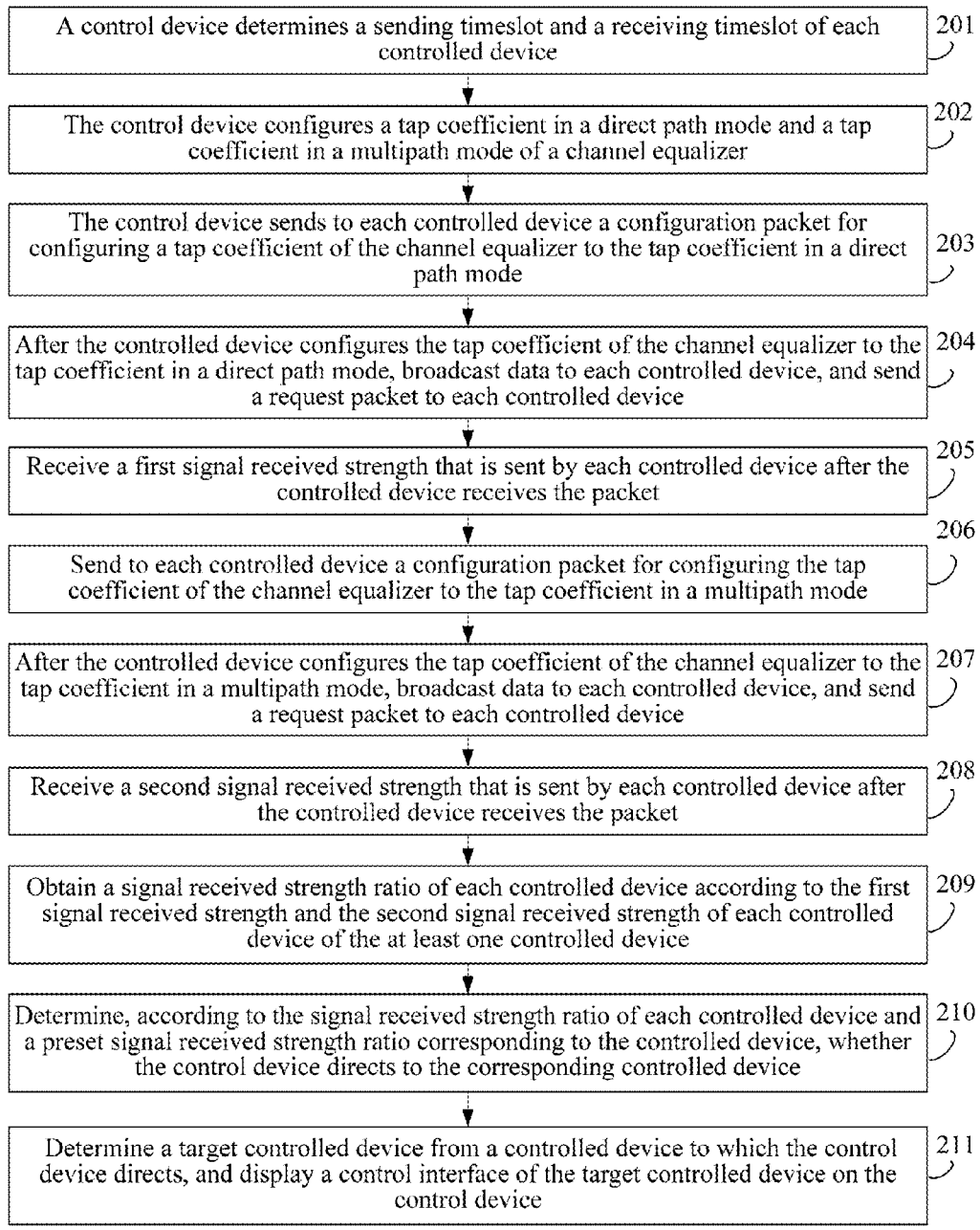
FIG. 2 is a flowchart of another method for selecting a controlled device according to an embodiment of the present invention.

FIG. 2 is a flowchart of another method for selecting a controlled device according to an embodiment of the present invention. The technical solution provided in this embodiment is applied to a wireless network that includes one control device and at least one controlled device. As shown in FIG. 2, this embodiment includes the following executed steps:

Step 201: The control device determines a sending timeslot and a receiving timeslot of each controlled device.

In a process of constructing the wireless network, the control device may configure a clock of each controlled device of the at least one controlled device according to a short range communication clock of the control device, where the short range communication clock of the controlled device is strictly synchronized to the short range communication clock of the control device, so that link timeslots of the devices can be uniform and synchronized. The control device sends a data packet to and receives a data packet from each controlled device of the at least one controlled device in a time division duplexing (TDD) mode. In addition to a broadcast packet, within one timeslot, the control device can send a data packet to only one controlled device or can receive a data packet from only one controlled device.

Step 202: The control device configures a tap coefficient in a direct path mode and a tap coefficient in a multipath mode of a channel equalizer.

To implement the technical solutions of the embodiments of the present invention, in a process of actually constructing the wireless network, the control device may also acquire a current wireless channel environment model, and generates, according to the current wireless channel environment model, a tap coefficient in a direct path mode and a tap coefficient in a multipath mode of a channel equalizer of each controlled device of the at least one controlled device. The current wireless channel environment model may be acquired by using a channel estimation algorithm such as reference signal estimation, maximum likelihood estimation, or blind estimation, and a specific implementation manner does not constitute a limitation on the present invention. The control device separately sends the tap coefficient in a direct path mode and the tap coefficient in a multipath mode of the channel equalizer of each controlled device of the at least one controlled device to the corresponding controlled device.

Optionally, in a direct path mode, a tap coefficient of a direct path component occupies the largest weight, where a weight value is far greater than that of a tap coefficient of a multipath component; and in a multipath mode, a tap coefficient of a direct path component occupies a relatively small weight, or a weight thereof is zero, and a tap coefficient of a multipath component is relatively large. Specific weight allocation between tap coefficients may be set according to an indoor wireless channel environment model, where the wireless channel environment model includes a multipath fading channel model, a Rayleigh channel fading model caused by noise, and an interference model of another ISM frequency band noise. The wireless channel environment is related to placement positions of indoor electronics devices, placement positions of indoor furniture, layout of the room, and a radio interference status of the cell, and is time variant. Wireless channel environments corresponding to different rooms are different. The tap coefficient of the channel equalizer may be specifically set by using a channel equalization algorithm such as zero forcing, minimum mean square error, or Kalman filter, and a specific implementation manner does not constitute a limitation on the present invention.

In a configuration process, for different controlled devices, the control device may set a same tap coefficient in a direct path mode and a same tap coefficient in a multipath mode of the channel equalizer, or may set different tap coefficients of the channel equalizers.

Step 203: The control device sends to each controlled device a configuration packet for configuring a tap coefficient of the channel equalizer to the tap coefficient in a direct path mode.

After receiving the tap coefficient configuration packet of the channel equalizer, each controlled device configures the tap coefficient of the channel equalizer to a tap coefficient, specified by the control device, in a direct path mode, so that the control device obtains a first signal received strength in a direct path mode through calculation according to the tap coefficient in a direct path mode of the channel equalizer.

Step 204: After the controlled device configures the tap coefficient of the channel equalizer to the tap coefficient in a direct path mode, broadcast data to each controlled device, and send a request packet to each controlled device.

After receiving the tap coefficient configuration packet of the channel equalizer, each controlled device configures the tap coefficient of the channel equalizer to a tap coefficient, specified by the control device, in a direct path mode. After completing the configuration, the control device broadcasts data to each controlled device, where the data is mainly used to detect a strength of a received signal. Meanwhile, the control device sends a request packet to each controlled device, and reads a signal received strength of the data received by the controlled device.

Step 205: Receive a first signal received strength that is sent by each controlled device after the controlled device receives the packet.

After receiving an instruction sent by the control device and for reading the signal received strength, each controlled device sends a signal strength $I_{Di}$ of the received data to the control device. The first signal received strength mentioned herein is used to characterize a value of a strength of a signal obtained after the controlled device processes, within unit time by using an equalizer for which a tap coefficient in a direct path mode is set, an electromagnetic signal received by an antenna, where a measurement index may be a signal power, a signal maximum amplitude value, a signal peak-peak value, or the like.

Step 206: Send to each controlled device a configuration packet for configuring the tap coefficient of the channel equalizer to the tap coefficient in a multipath mode.

Step 207: After the controlled device configures the tap coefficient of the channel equalizer to the tap coefficient in a multipath mode, broadcast data to each controlled device, and send a request packet to each controlled device.

After receiving the tap coefficient configuration packet of the channel equalizer, each controlled device configures the tap coefficient of the channel equalizer to a tap coefficient, specified by the control device, in a multipath mode. After completing the configuration, the control device broadcasts data to each controlled device, where the data is mainly used to detect a strength of a received signal. Meanwhile, the control device sends a request packet to each controlled device, and reads a signal received strength of the data received by the controlled device.

Step 208: Receive a second signal received strength that is sent by each controlled device after the controlled device receives the packet.

After receiving an instruction sent by the control device and for reading the signal received strength, each controlled device sends a signal strength $I_{Mi}$ of the received data to the control device. The second signal received strength mentioned herein is used to characterize a value of a strength of a signal obtained after the controlled device processes, within unit time by using an equalizer for which a tap coefficient in a multipath mode is set, an electromagnetic signal received by an antenna, where a measurement index may be a signal power, a signal maximum amplitude value, a signal peak-peak value, or the like. However, the measurement index should be the same as the measurement index of the first signal received strength.

The control device may repeat the foregoing step 205 to step 208, and after acquiring multiple sets of $I_{Di}$ and $I_{Mi}$ data corresponding to each controlled device, perform weighted averaging processing on the data; therefore, it may be avoided that an error of test data is relatively large during testing due to random mutation of a channel, intensive noise interference, or the like, thereby improving reliability of the test data. After the weighted averaging processing, the final first signal received strength $I_{Di}$ and second signal received strength $I_{Mi}$ are obtained.

Step 209: Obtain a signal received strength ratio of each controlled device according to the first signal received strength and the second signal received strength of each controlled device of the at least one controlled device.

For the controlled device i, the signal received strength ratio may be defined in two manners. First is: the signal received strength ratio is a ratio of the first signal received strength $I_{Di}$ to the second signal received strength $I_{Mi}$ of the controlled device i, that is, the signal received strength ratio of the controlled device i is $$D'_i = \frac{I_{Di}}{I_{Mi}};$$

the other is: the signal received strength ratio is a ratio of the second signal received strength $I_{Mi}$ to the first signal received strength $I_{Di}$ of the controlled device i, that is, the signal received strength ratio of the controlled device i is $$D'_i = \frac{I_{Mi}}{I_{Di}}.$$

Which manner is used may be autonomously determined by a user or a developer, but only one definition manner is used in one actual case.

The control device may set a preset signal received strength ratio of the controlled device according to the tap coefficient in a direct path mode and the tap coefficient in a multipath mode of the channel equalizer that are configured for the controlled device i. Same as the definition of the signal received strength ratio of the controlled device i, the preset signal received strength ratio of the controlled device i may also have two definition manners. Generally, for the tap coefficient in a direct path mode of the channel equalizer, a tap coefficient corresponding to a direct path component is far greater than a tap coefficient corresponding to a multipath component, and the tap coefficient of the multipath component is generally very small and even is zero; for a multipath mode, a tap coefficient corresponding to a multipath component is far greater than a tap coefficient corresponding to a direct path component, and the tap coefficient of the direct path component is generally very small and even is zero. Therefore, if the first definition manner is used, the preset signal strength ratio $D_i$ is in direct proportion to a difference between the tap coefficient of the direct path component in a direct path mode and the tap coefficient of the direct path component in a multipath mode, where a larger difference indicates a larger value of the preset signal strength ratio $D_i$. Similarly, if the second definition manner is used, the preset signal strength ratio $D_i$ is in inverse proportion to a difference between the tap coefficient of the direct path component in a direct path mode and the tap coefficient of the direct path component in a multipath mode, where a larger difference indicates a smaller value of the preset signal strength ratio $D_i$.

Step 210: Determine, according to the signal received strength ratio of each controlled device and a preset signal received strength ratio corresponding to the controlled device, whether the control device directs to the corresponding controlled device.

Figure 3:
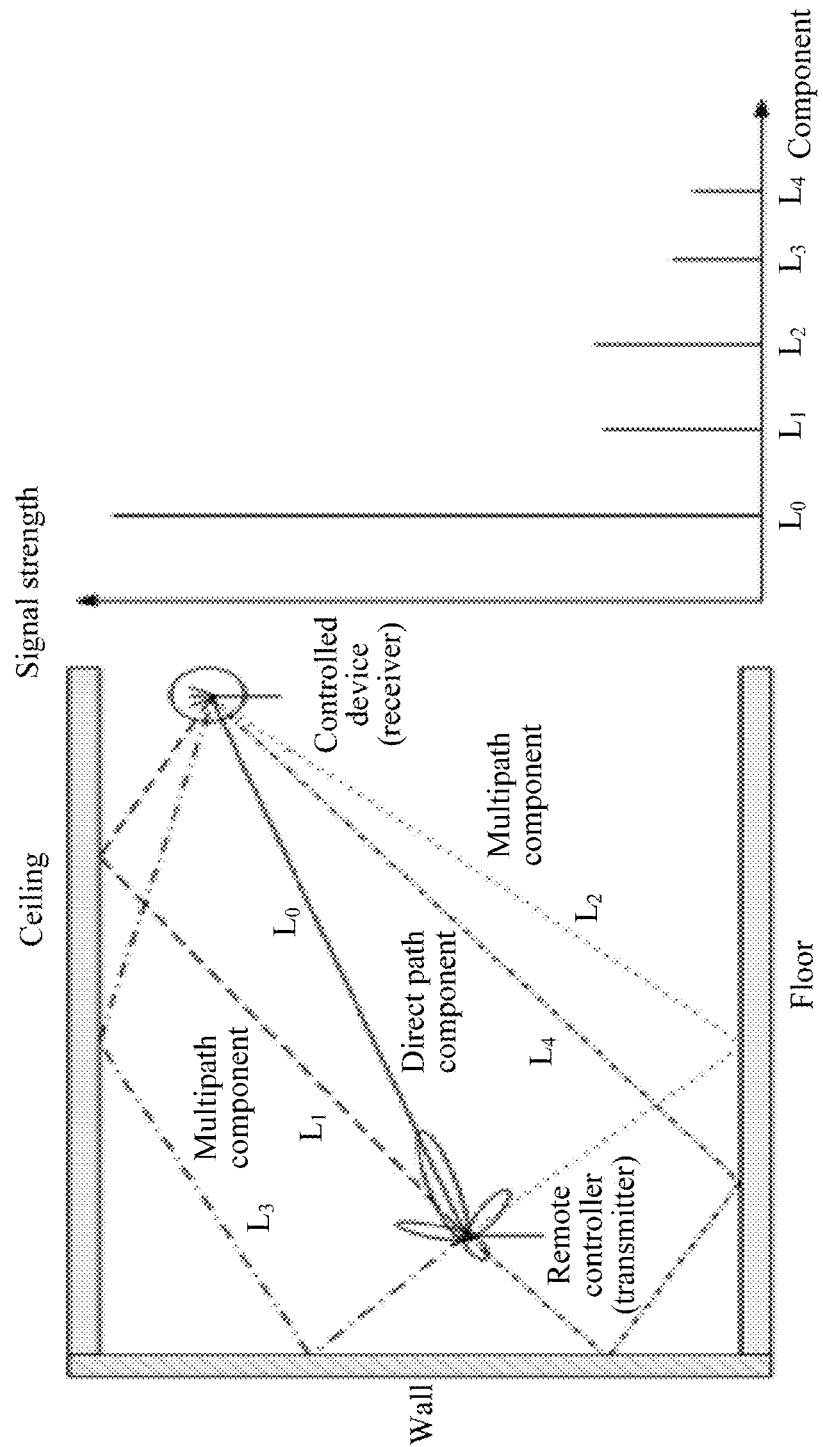
FIG. 3 is a schematic diagram of signal transmission paths when a control device directs to a controlled device and a signal received strength under each path according to an embodiment of the present invention.

Optionally, it is assumed that the control device directs to the controlled device i, a directed direction of the control device and the controlled device i form a direct path, and the path is a line of sight reachable path, that is, there is no blocking between the control device and the controlled device. In this application, a short range communication antenna of the control device is a directional antenna and a main lobe direction directs to a directed direction of the control device; therefore, for a received signal of the controlled device i, a signal strength of a direct path component is the largest and another signal strength of a multipath component is relatively small. A schematic diagram of a signal transmission path when the control device directs to the controlled device and a signal received strength under each path is shown in FIG. 3. As shown in FIG. 3, when a data signal is received in a direct path mode at a receiving timeslot of the controlled device, because the tap coefficient, of a direct path component, in a direct path mode of the channel equalizer is far greater than another tap coefficient of the multipath component, a received strength of a signal obtained after channel equalization is relatively large; on the contrary, when a data signal is received in a multipath mode at a receiving timeslot of the controlled device, because the tap coefficient of the direct path component of the channel equalizer is far less than another tap coefficient of the multipath component, a received strength of a signal obtained after channel equalization is relatively small. Therefore, it may be obtained that, when the control device directs to the controlled device, the obtained first signal received strength $I_{Di}$ in a direct path mode is far greater than the second signal received strength $I_{Mi}$ in a multipath mode.

Figure 4:
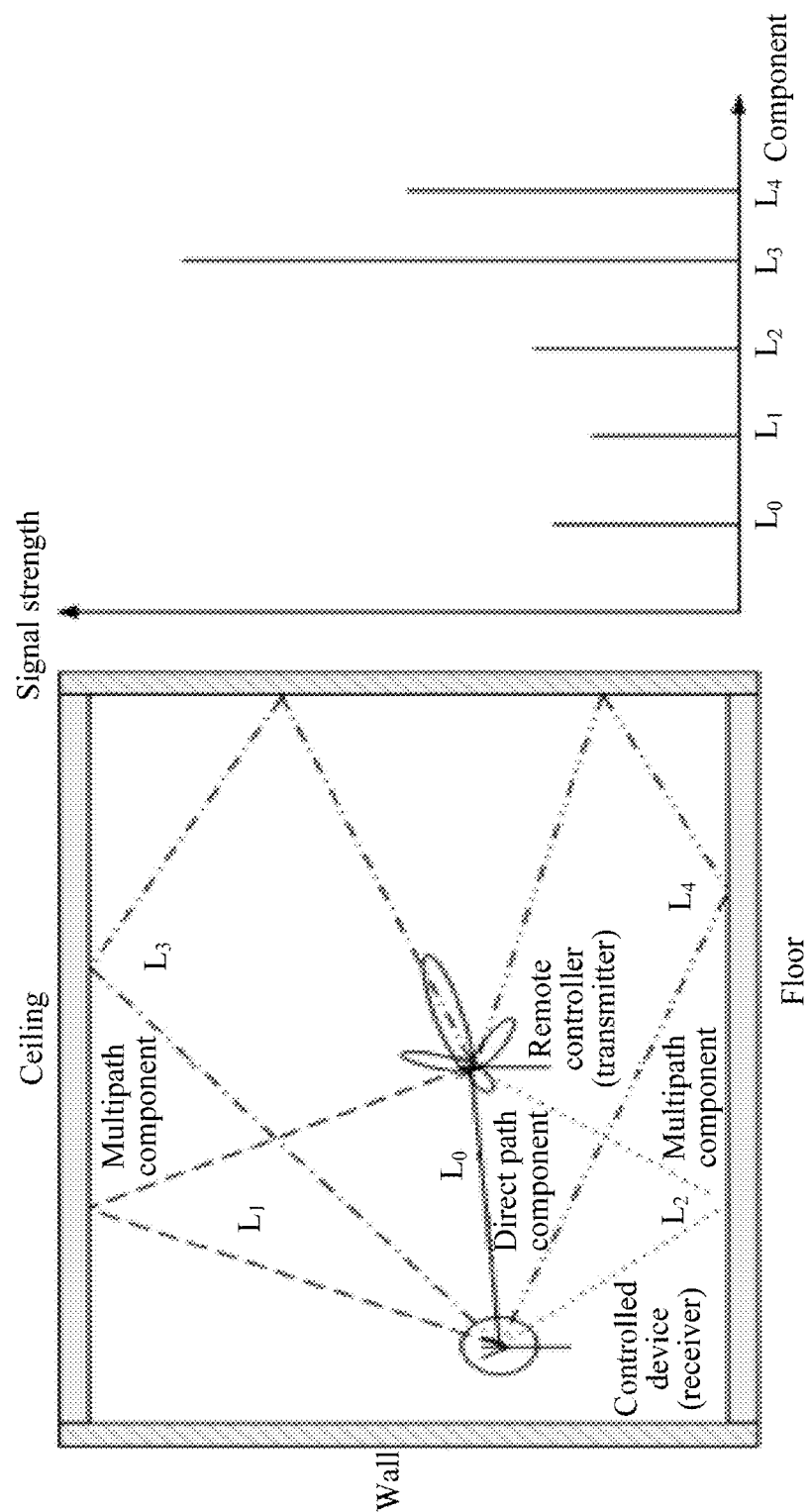
FIG. 4 is a schematic diagram of signal transmission paths when a control device does not direct to a controlled device and a signal received strength under each path according to an embodiment of the present invention.

It is assumed that the control device does not direct to the controlled device i, a main lobe direction of the short range communication antenna does not direct to the controlled device i, and consequently, a strength of a signal of a direct path component from the control device to the controlled device is relative small, and even, because there is a blocking object between the control device and the controlled device, the strength of the signal of the direct path component from the control device to the controlled device is zero. A signal emitted by a main lobe direction of the short range communication antenna of the control device is reflected by the walls and the ceilings and reaches the controlled device, and a multipath component is generated; therefore, the signal strength of the multipath component is relatively large. A schematic diagram of a signal transmission path when the control device does not direct to the controlled device and a signal received strength under each path is shown in FIG. 4. As shown in FIG. 4, when a data signal is received in a direct path mode at a receiving timeslot of the controlled device, because the tap coefficient, of a multipath component, in a direct path mode of a channel equalizer is far less than the tap coefficient of a direct path component, a received signal strength after the channel equalizer is relatively small; on the contrary, when a data signal is received in a multipath mode at a receiving timeslot of the controlled device, because the tap coefficient of the multipath component of the channel equalizer is far greater than the tap coefficient of the direct path component, the received signal strength after the channel equalizer is relatively large. Therefore, it may be obtained that, when the control device does not direct to the controlled device, the obtained first signal received strength $I_{Di}$ in a direct path mode is far less than the second signal received strength $I_{Mi}$ in a multipath mode.

Therefore, for each controlled device i, the preset signal received strength ratio is compared with the signal received strength ratio calculated in step 102. For the first definition manner in step 209, if the signal received strength ratio is greater than the preset signal received strength ratio, it is determined that the control device directs to the controlled device i; if the signal received strength ratio is less than the preset signal received strength ratio, it is determined that the control device does not direct to the controlled device i; if the signal received strength ratio is equal to the preset signal received strength ratio, it may be determined that the control device directs to the controlled device i, or it may be determined that the control device does not direct to the controlled device i, which may be set according to actual needs. For the second definition manner in step 102, if the signal received strength ratio is less than the preset signal received strength ratio, it is determined that the control device directs to the controlled device i; if the signal received strength ratio is greater than the preset signal received strength ratio, it is determined that the control device does not direct to the controlled device i; if the signal received strength ratio is equal to the preset signal received strength ratio, it may be determined that the control device directs to the controlled device i, or it may be determined that the control device does not direct to the controlled device i, which may be set according to actual needs.

Step 211: Determine a target controlled device from the controlled device to which the control device directs, and display a control interface of the target controlled device on the control device.

According to the comparison result in step 210, the determining a target controlled device from the controlled device to which the control device directs includes: when it is determined that the control device directs to only one controlled device, determining that the controlled device that is directed to is the target controlled device; or when it is determined that the control device directs to two controlled devices, sending prompt information to instruct a user to select the target controlled device, and selecting one controlled device from the two controlled devices as the target controlled device according to a processing instruction of the user; or when it is determined that the control device directs to more than two controlled devices, re-executing the method for selecting a controlled device, or sending prompt information to instruct a user to select the target controlled device, and selecting one controlled device from the more than two controlled devices as the target controlled device according to a processing instruction of the user.

When it is determined that the control device directs to only one controlled device, the control device may enable the control interface of the target controlled device to pop up automatically, so that the user performs a corresponding control operation on the controlled device. When it is determined that the control device directs to two controlled devices, for example, it is determined that the control device directs to a set top box and a television at the same time, the control device may send prompt information to instruct the user to select the target controlled device, where a prompt manner may be prompting the user in a manner of displaying an operation interface on a display component of the control device, or may be prompting the user in a manner that the control device plays a voice, displays a text, displays an image, or the like, and the user chooses, according to the prompt, to control a controlled device. The control device may generate a corresponding processing instruction according to an operation of the user, select a corresponding controlled device as the target controlled device according to the processing instruction, and enable the control interface of the current controlled device to pop up automatically, so that the user performs a corresponding control operation on the controlled device. In addition, besides sending the prompt information to instruct the user to select the target controlled device, the control device may also automatically select a target controlled device according to a priority of each controlled device, a preference of the user, a use habit of the user, or the like.

If it is determined in step 210 that the control device directs to more than two controlled devices, it may indicate that selection of a controlled device fails, and the foregoing method for selecting a controlled device is re-executed, or the prompt information may be sent to instruct the user to select the target controlled device, and the user selects one, from the controlled device that is directed to, as the target controlled device. Which manner of selecting a target controlled device is used may be determined by the user or the developer.

Therefore, in this embodiment of the present invention, it is implemented that one control device may determine, according to a received strength of a signal transmitted back by a controlled device, whether the control device directs to the controlled device. According to an operation habit of controlling, by people, a device by using a remote controller, when a user directs the control device to a controlled device, it represents that the user wants to control the controlled device; therefore, in this embodiment of the present invention, by means of determining whether the control device directs to the controlled device, a device that the user wants to control is identified based on the short range wireless communications technology, and a target controlled device is selected from multiple controlled devices, thereby improving user experience effect.

Figure 5:
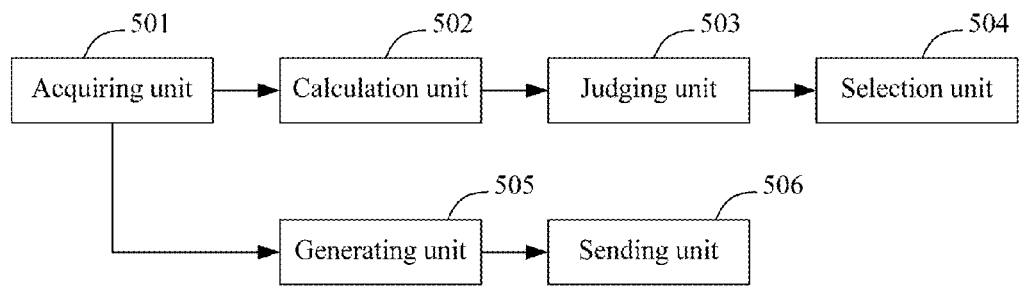
FIG. 5 is a schematic diagram of a control device for selecting a controlled device according to an embodiment of the present invention.

Accordingly, an embodiment of the present invention further provides a control device for selecting a controlled device, applied to a wireless network that includes one control device and at least one controlled device. FIG. 5 is a schematic diagram of the control device for selecting a controlled device according to this embodiment of the present invention. As shown in the figure, the controlled device provided in this embodiment includes:

an acquiring unit 501, configured to acquire a first signal received strength in a direct path mode and a second signal received strength in a multipath mode of each controlled device of at least one controlled device.

The acquiring unit 501 is specifically configured to broadcast data to the at least one controlled device, send a request packet to the at least one controlled device, and receive a response packet sent by each controlled device of the at least one controlled device, where the response packet includes the first signal received strength of the controlled device. The first signal received strength mentioned herein is used to characterize a value of a strength of a signal obtained after the controlled device processes, within unit time by using an equalizer for which a tap coefficient in a direct path mode is set, an electromagnetic signal received by an antenna, where a measurement index may be a signal power, a signal maximum amplitude value, a signal peak-peak value, or the like.

Optionally, the control device configures the tap coefficient in a direct path mode as a tap coefficient of the channel equalizer of the controlled device in the wireless network and sends the tap coefficient to each controlled device of the at least one controlled device according to a configured transceiving timeslot. After receiving a tap coefficient configuration packet of the channel equalizer, each controlled device configures the tap coefficient of the channel equalizer to a tap coefficient, specified by the control device, in a direct path mode. After completing the configuration, the control device broadcasts data to each controlled device, where the data is mainly used to detect a strength of a signal received by the controlled device. Meanwhile, the control device sends a request packet to each controlled device and reads a received signal strength of the data received by the controlled device. For a controlled device i, after receiving the request packet sent by the control device, the controlled device sends a signal strength $I_{Di}$ of the received data to the control device.

The acquiring unit 501 is specifically configured to broadcast data to the at least one controlled device, send a request packet to the at least one controlled device, and receive a response packet sent by each controlled device of the at least one controlled device, where the response packet includes the second signal received strength of the controlled device. The second signal received strength mentioned herein is used to characterize a value of a strength of a signal obtained after the controlled device processes, within unit time by using an equalizer for which a tap coefficient in a multipath mode is set, an electromagnetic signal received by an antenna, where a measurement index may be a signal power, a signal maximum amplitude value, a signal peak-peak value, or the like. However, the measurement index should be the same as the measurement index of the first signal received strength.

The control device configures the tap coefficient in a multipath mode as the tap coefficient of the channel equalizer of the controlled device in the picocell network and sends the tap coefficient to each controlled device of the at least one controlled device according to a configured transceiving timeslot. After receiving a tap coefficient configuration packet of the channel equalizer, each controlled device configures the tap coefficient of the channel equalizer to a tap coefficient, specified by the control device, in a multipath mode. After completing the configuration, the control device broadcasts data to each controlled device, where the data is mainly used to detect a strength of a signal received by the controlled device. Meanwhile, the control device sends a request packet to each controlled device and reads a received signal strength of the data received by the controlled device. For the controlled device i, after receiving the request packet sent by the control device, the controlled device sends a signal strength $I_{Mi}$ of the received data to the control device.

The acquiring unit 501 is specifically configured to broadcast data to the at least one controlled device for multiple times, acquire multiple signal received strengths corresponding to a direct path mode of each controlled device, and perform weighting processing on the multiple signal received strengths corresponding to the direct path mode of each controlled device, to obtain the first signal received strength. The acquiring unit 501 is specifically configured to broadcast data to the at least one controlled device for multiple times, acquire multiple signal received strengths corresponding to a multipath mode of each controlled device, and perform weighting processing on the multiple signal received strengths corresponding to the direct path mode of each controlled device, to obtain the second signal received strength.

Optionally, the control device may repeat the foregoing operations, and after acquiring multiple sets of $I_{Di}$ and $I_{Mi}$ data corresponding to each controlled device, perform weighted averaging processing on the data; therefore, it may be avoided that an error of test data is relatively large during testing due to random mutation of a channel, intensive noise interference, or the like, thereby improving reliability of the test data. After the weighted averaging processing, the final first signal received strength $I_{Di}$ and second signal received strength $I_{Mi}$ are obtained.

The calculation unit 502 is configured to obtain a signal received strength ratio of each controlled device according to the first signal received strength and the second signal received strength of each controlled device of the at least one controlled device.

For the controlled device i, the signal received strength ratio may be defined in two manners. First is: the signal received strength ratio is a ratio of the first signal received strength $I_{Di}$ to the second signal received strength $I_{Mi}$ of the controlled device i, that is, the signal received strength ratio of the controlled device i is $$D'_i = \frac{I_{Di}}{I_{Mi}};$$

the other is: the signal received strength ratio is a ratio of the second signal received strength $I_{Mi}$ to the first signal received strength $I_{Di}$ of the controlled device i, that is, the signal received strength ratio of the controlled device i is $$D'_i = \frac{I_{Mi}}{I_{Di}}.$$

Which manner is used may be autonomously determined by a user or a developer, but only one definition manner is used in one actual case.

The control device may set a preset signal received strength ratio of the controlled device according to the tap coefficient in a direct path mode and the tap coefficient in a multipath mode of the channel equalizer that are configured for the controlled device i. Same as the definition of the signal received strength ratio of the controlled device i, the preset signal received strength ratio of the controlled device i may also have two definition manners. Generally, for the tap coefficient in a direct path mode of the channel equalizer, a tap coefficient corresponding to a direct path component is far greater than a tap coefficient corresponding to a multipath component, and the tap coefficient of the multipath component is generally very small and even is zero; for a multipath mode, a tap coefficient corresponding to a multipath component is far greater than a tap coefficient corresponding to a direct path component, and the tap coefficient of the direct path component is generally very small and even is zero. Therefore, if the first definition manner is used, the preset signal strength ratio $D_i$ is in direct proportion to a difference between the tap coefficient of the direct path component in a direct path mode and the tap coefficient of the direct path component in a multipath mode, where a larger difference indicates a larger value of the preset signal strength ratio $D_i$. Similarly, if the second definition manner is used, the preset signal strength ratio $D_i$ is in inverse proportion to a difference between the tap coefficient of the direct path component in a direct path mode and the tap coefficient of the direct path component in a multipath mode, where a larger difference indicates a smaller value of the preset signal strength ratio $D_i$.

The judging unit 503 is configured to determine, according to the signal received strength ratio of each controlled device of the at least one controlled device and a preset signal received strength ratio corresponding to the controlled device, whether the control device directs to the corresponding controlled device.

If the signal received strength ratio of each controlled device is a ratio of the first signal received strength to the second signal received strength of each controlled device of the at least one controlled device, the judging unit 503 is specifically configured to: if the signal received strength ratio of each controlled device is greater than the preset signal received strength ratio corresponding to the controlled device, determine that the control device directs to the controlled device; if the signal received strength ratio of each controlled device is less than the preset signal received strength ratio, determine that the control device does not direct to the controlled device; if the signal received strength ratio of the controlled device is equal to the preset signal received strength ratio, it can be determined that the control device directs to the controlled device, or it can be determined that the control device does not direct to the controlled device, which may be set according specific needs.

If the signal received strength ratio of each controlled device is a ratio of the second signal received strength to the first signal received strength of each controlled device of the at least one controlled device, the judging unit 503 is specifically configured to: if the signal received strength ratio of each controlled device is less than the preset signal received strength ratio corresponding to the controlled device, determine that the control device directs to the controlled device; if the signal received strength ratio of each controlled device is greater than the preset signal received strength ratio, determine that the control device does not direct to the controlled device; if the signal received strength ratio of the controlled device is equal to the preset signal received strength ratio, determine that the control device directs to the controlled device, or determine that the control device does not direct to the controlled device, which may be set according specific needs.

The selection unit 504 is configured to determine a target controlled device from the controlled device to which the control device directs, and display a control interface of the target controlled device on the control device.

The selection unit 504 is specifically configured to: if it is determined that the control device directs to only one controlled device, determine that the controlled device that is directed to is the target controlled device; or if it is determined that the control device directs to two controlled devices, send prompt information to instruct a user to select the target controlled device, and select one controlled device from the two controlled devices as the target controlled device according to a processing instruction of the user; or if it is determined that the control device directs to more than two controlled devices, re-execute the method for selecting a controlled device, or send prompt information to instruct a user to select the target controlled device, and select one controlled device from the more than two controlled devices as the target controlled device according to a processing instruction of the user.

Optionally, if the judging unit 503 determines that the control device directs to only one controlled device, the control device may enable the control interface of the target controlled device to pop up automatically, so that the user performs a corresponding control operation on the controlled device; if the judging unit 503 determines that the control device directs to two controlled devices, for example, determines that the control device directs to a set top box and a television at the same time, the control device may send prompt information to instruct the user to select the target controlled device, where a prompt manner may be prompting the user in a manner of displaying an operation interface on a display component of the control device, or may be prompting the user in a manner that the control device plays a voice, displays a text, displays an image, or the like, and the user chooses, according to the prompt, to control a controlled device. The control device may generate a corresponding processing instruction according to an operation of the user, select a corresponding controlled device as the target controlled device according to the processing instruction, and enable the control interface of the current controlled device to pop up automatically, so that the user performs a corresponding control operation on the controlled device. In addition, besides sending the prompt information to instruct the user to select the target controlled device, the control device may also automatically select a target controlled device according to a priority of each controlled device, a preference of the user, a use habit of the user, or the like.

If the judging unit 503 determines that the control device directs to more than two controlled devices, it may indicate that selecting a controlled device fails, and the foregoing method for selecting a controlled device is re-executed, or the prompt information may be sent to instruct the user to select the target controlled device, and the user selects one, from the controlled device that is directed to, as the target controlled device. Which manner of selecting a target controlled device is used may be determined by the user or the developer.

The control device provided in this embodiment of the present invention further includes a generating unit 505 and a sending unit 506, where the acquiring unit 501 is further configured to acquire a current wireless channel environment model of the wireless network; the generating unit 505 is configured to generate, according to the current wireless channel environment model, a tap coefficient in a direct path mode of a channel equalizer and a tap coefficient in a multipath mode of each controlled device of the at least one controlled device in the wireless network; and the sending unit 506, the sending unit, is configured to separately send the tap coefficient in a direct path mode and the tap coefficient in a multipath mode of the channel equalizer of each controlled device of the at least one controlled device to a corresponding controlled device, so that each controlled device obtains the first signal received strength through calculation according to the tap coefficient in a direct path mode of the channel equalizer of the controlled device and obtains the second signal received strength through calculation according to the tap coefficient in a multipath mode of the channel equalizer of the controlled device.

To implement the technical solutions of the embodiments of the present invention, in a process of actually constructing the wireless network, the control device may also acquire the current wireless channel environment model, and generate, according to the current wireless channel environment model, the tap coefficient in a direct path mode and the tap coefficient in a multipath mode of a channel equalizer of each controlled device of the at least one controlled device. The current wireless channel environment model may be acquired by using a channel estimation algorithm such as reference signal estimation, maximum likelihood estimation, or blind estimation, and a specific implementation manner does not constitute a limitation on the present invention. The control device separately sends the tap coefficient in a direct path mode and the tap coefficient in a multipath mode of the channel equalizer of each controlled device of the at least one controlled device to the corresponding controlled device.

Optionally, in a direct path mode, a tap coefficient of a direct path component occupies the largest weight, where a weight value is far greater than that of a tap coefficient of a multipath component; and in a multipath mode, a tap coefficient of a direct path component occupies a relatively small weight, or a weight thereof is zero, and a tap coefficient of a multipath component is relatively large. Specific weight allocation between tap coefficients may be set according to an indoor wireless channel environment model, where the wireless channel environment model includes a multipath fading channel model, a Rayleigh channel fading model caused by noise, and an interference model of another ISM frequency band noise. The wireless channel environment is related to placement positions of indoor electronics devices, placement positions of indoor furniture, layout of the room, and a radio interference status of the cell, and is time variant. Wireless channel environments corresponding to different rooms are different.

In a configuration process, for different controlled devices, the control device may set a same tap coefficient in a direct path mode and a same tap coefficient in a multipath mode of the channel equalizer, or may set different tap coefficients of the channel equalizers.

Therefore, in this embodiment of the present invention, it is implemented that one control device may determine, according to a received strength of a signal transmitted back by a controlled device, whether the control device directs to the controlled device. According to an operation habit of controlling, by people, a device by using a remote controller, when a user directs the control device to a controlled device, it represents that the user wants to control the controlled device; therefore, in this embodiment of the present invention, by means of determining whether the control device directs to the controlled device, a device that the user wants to control is identified based on the short range wireless communications technology, and a target controlled device is selected from multiple controlled devices, thereby improving user experience effect.

Figure 6:
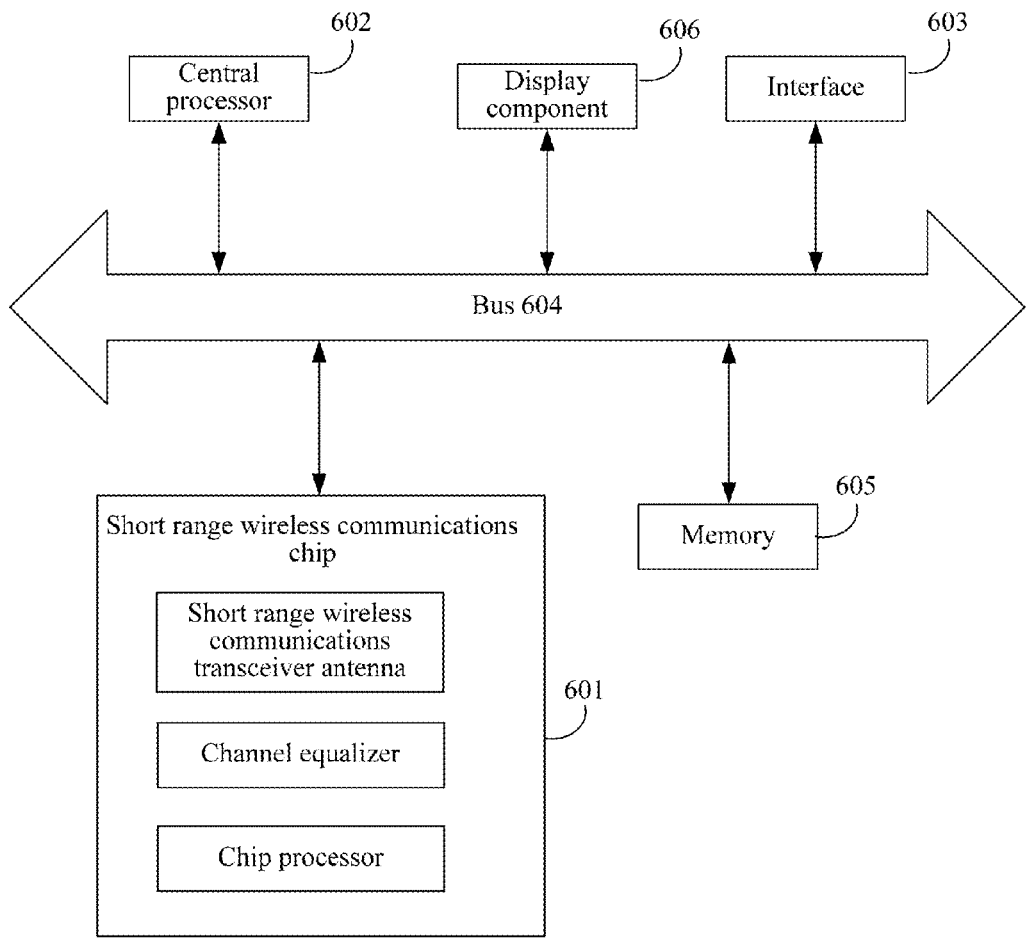
FIG. 6 is a schematic diagram of a control device for selecting a controlled device according to an embodiment of the present invention.

FIG. 6 is a schematic diagram of a control device for selecting a controlled device according to an embodiment of the present invention. As shown in the figure, the control device provided in this embodiment includes a short range wireless communications chip 601, a central processor 602, an interface 603, and a display component 606, where the short range wireless communications chip 601 and the central processor 602 are connected by using a bus 604 and the interface 603. The short range wireless communications chip 601 is integrated with a short range wireless communications transceiver antenna and a channel equalizer, and even is integrated with a short range wireless communications chip processor. The control device provided in this embodiment of the present invention may further include a memory 605, configured to store program code and transmit the program code to the central processor. The memory may include a volatile memory, for example, a random-access memory (RAM); the memory may further include a non-volatile memory, for example, a read-only memory (ROM), a flash memory, a hard disk drive (HDD), or a solid-state drive (SSD). The memory may further include a combination of the foregoing memories. The memory 605 is connected to the central processor 602 and the interface 603 by using the bus 604, where the short range wireless communications chip 601 is configured to acquire a first signal received strength in a direct path mode and a second signal received strength in a multipath mode of each controlled device of at least one controlled device;

the central processor 602 is configured to obtain a signal received strength ratio of each controlled device according to the first signal received strength and the second signal received strength of each controlled device of the at least one controlled device;

the central processor 602 is configured to determine, according to the signal received strength ratio of each controlled device of the at least one controlled device and a preset signal received strength ratio corresponding to the controlled device, whether the control device directs to the corresponding controlled device;

the central processor 602 is configured to determine a target controlled device from the controlled device to which the control device directs; and the display component 606 is configured to display a control interface of the target controlled device.

Optionally, before acquiring the first signal received strength in a direct path mode and the second signal received strength in a multipath mode of each controlled device of the at least one controlled device, the short range wireless communications chip 601 is further configured to acquire a current wireless channel environment model of the wireless network; the central processor 602 is configured to generate, according to the current wireless channel environment model, a tap coefficient in a direct path mode and a tap coefficient in a multipath mode of a channel equalizer of each controlled device of the at least one controlled device in the wireless network; and the short range wireless communications chip 601 is configured to separately send the tap coefficient in a direct path mode and the tap coefficient in a multipath mode of the channel equalizer of each controlled device of the at least one controlled device to a corresponding controlled device, so that each controlled device obtains the first signal received strength through calculation according to the tap coefficient in a direct path mode of the channel equalizer of the controlled device and obtains the second signal received strength through calculation according to the tap coefficient in a multipath mode of the channel equalizer of the controlled device.

The first signal received strength mentioned herein is used to characterize a value of a strength of a signal obtained after the controlled device processes, within unit time by using an equalizer for which a tap coefficient in a direct path mode is set, an electromagnetic signal received by an antenna, where a measurement index may be a signal power, a signal maximum amplitude value, a signal peak-peak value, or the like. The second signal received strength mentioned herein is used to characterize a value of a strength of a signal obtained after the controlled device processes, within unit time by using an equalizer for which a tap coefficient in a multipath mode is set, an electromagnetic signal received by an antenna, where a measurement index may be a signal power, a signal maximum amplitude value, a signal peak-peak value, or the like. The measurement index of the second signal received strength should be the same as the measurement index of the first signal received strength.

Optionally, that the short range wireless communications chip 601 is configured to acquire a first signal received strength in a direct path mode of each controlled device of at least one controlled device includes: the short range wireless communications chip is configured to broadcast data to the at least one controlled device, and separately send a request packet to the at least one controlled device; and receive a response packet sent by each controlled device of the at least one controlled device, where the response packet includes the first signal received strength of the controlled device.

Optionally, that the short range wireless communications chip 601 is configured to acquire a second signal received strength in a multipath mode of each controlled device of the at least one controlled device includes: the short range wireless communications chip is configured to broadcast data to the at least one controlled device, and separately send a request packet to the at least one controlled device; and receive a response packet sent by each controlled device of the at least one controlled device, where the response packet includes the second signal received strength of the controlled device.

Optionally, that the short range wireless communications chip is configured to acquire a first signal received strength in a direct path mode of each controlled device of at least one controlled device includes: the short range wireless communications chip is configured to broadcast data to the at least one controlled device for multiple times, acquire multiple signal received strengths corresponding to a direct path mode of each controlled device, and perform weighting processing on the multiple signal received strengths corresponding to the direct path mode of each controlled device, to obtain the first signal received strength.

That the short range wireless communications chip 601 is configured to acquire a second signal received strength in a multipath mode of each controlled device of the at least one controlled device includes: the short range wireless communications chip is configured to broadcast data to the at least one controlled device for multiple times, acquire multiple signal received strengths corresponding to a multipath mode of each controlled device, and perform weighting processing on the multiple signal received strengths corresponding to the multipath mode of each controlled device, to obtain the second signal received strength.

That is, the control device may repeat the foregoing operations, and after acquiring multiple sets of signal received strength data in a direct path mode and signal received strength data in a multipath mode that correspond to each controlled device, perform weighted averaging processing on the data; therefore, it may be avoided that an error of test data is relatively large during testing due to random mutation of a channel or intensive noise interference, thereby improving reliability of the test data. After the weighted averaging processing, the final first signal received strength and second signal received strength are obtained.

Optionally, for each controlled device, the signal received strength ratio may be defined in two manners. First is: the signal received strength ratio is a ratio of the first signal received strength to the second signal received strength of the controlled device, that is, the signal received strength ratio of the controlled device; the other is: the signal received strength ratio is a ratio of the second signal received strength to the first signal received strength of the controlled device, that is, the signal received strength ratio of the controlled device. Which manner is used may be autonomously determined by a user or a developer, but only one definition manner is used in one actual case.

When the signal received strength ratio of each controlled device is a ratio of the first signal received strength to the second signal received strength of each controlled device of the at least one controlled device, that the central processor 602 is configured to determine, according to the signal received strength ratio of each controlled device of the at least one controlled device and a preset signal received strength ratio corresponding to the controlled device, whether the control device directs to the corresponding controlled device includes: if the signal received strength ratio of each controlled device is greater than the preset signal received strength ratio corresponding to the controlled device, determining that the control device directs to the controlled device; otherwise, determining that the control device does not direct to the controlled device.

When the signal received strength ratio of each controlled device is a ratio of the second signal received strength to the first signal received strength of each controlled device of the at least one controlled device, that the central processor 602 is configured to determine, according to the signal received strength ratio of each controlled device of the at least one controlled device and a preset signal received strength ratio corresponding to the controlled device, whether the control device directs to the corresponding controlled device includes: if the signal received strength ratio of each controlled device is less than the preset signal received strength ratio corresponding to the controlled device, determining that the control device directs to the controlled device; otherwise, determining that the control device does not direct to the controlled device.

Optionally, that the central processor 602 is configured to determine a target controlled device from the controlled device to which the control device directs includes: if it is determined that the control device directs to only one controlled device, determining that the controlled device that is directed to is the target controlled device; or if it is determined that the control device directs to two controlled devices, sending prompt information to instruct a user to select the target controlled device, and selecting one controlled device from the two controlled devices as the target controlled device according to a processing instruction of the user; or if it is determined that the control device directs to more than two controlled devices, re-executing the method for selecting a controlled device, or sending prompt information to instruct a user to select the target controlled device, and selecting one controlled device from the more than two controlled devices as the target controlled device according to a processing instruction of the user.

When it is determined that the control device directs to only one controlled device, the control device may enable the control interface of the target controlled device to pop up automatically, so that the user performs a corresponding control operation on the controlled device; when it is determined that the control device directs to two controlled devices, for example, it is determined that the control device directs to a set top box and a television at the same time, the control device may send prompt information to instruct the user to select the target controlled device, where a prompt manner may be prompting the user in a manner of displaying an operation interface on a display component of the control device, or may be prompting the user in a manner that the control device plays a voice, displays a text, displays an image, or the like, and the user chooses, according to the prompt, to control a controlled device. The control device may generate a corresponding processing instruction according to an operation of the user, select a corresponding controlled device as the target controlled device according to the processing instruction, and enable the control interface of the current controlled device to pop up automatically, so that the user performs a corresponding control operation on the controlled device. In addition, besides sending the prompt information to instruct the user to select the target controlled device, the control device may also automatically select a target controlled device according to a priority of each controlled device, a preference of the user, a use habit of the user, or the like.

If it is determined that the control device directs to more than two controlled devices, it may indicate that selection of a controlled device fails, and the foregoing method for selecting a controlled device is re-executed, or the prompt information may be sent to instruct the user to select the target controlled device, and the user selects one, from the controlled device that is directed to, as the target controlled device. Which manner of selecting a target controlled device is used may be determined by the user or the developer.

Therefore, in this embodiment of the present invention, it is implemented that one control device may determine, according to a received strength of a signal transmitted back by a controlled device, whether the control device directs to the controlled device. According to an operation habit of controlling, by people, a device by using a remote controller, when a user directs the control device to a controlled device, it represents that the user wants to control the controlled device; therefore, in this embodiment of the present invention, by means of determining whether the control device directs to the controlled device, a device that the user wants to control is identified based on the short range wireless communications technology, and a target controlled device is selected from multiple controlled devices, thereby improving user experience effect.

An embodiment of the present invention further provides a system for selecting a controlled device. The system uses the method for selecting a controlled device, and includes the control device, shown in FIG. 5, for selecting a controlled device, and at least one controlled device. In this system, the control device acquires a first signal received strength in a direct path mode and a second signal received strength in a multipath mode of each controlled device of the at least one controlled device; obtains a signal received strength ratio of each controlled device according to the first signal received strength and the second signal received strength of each controlled device; determines, according to the signal received strength ratio of each controlled device and a preset signal received strength ratio corresponding to the controlled device, whether the control device directs to the corresponding controlled device; and determines a target controlled device from the controlled device to which the control device directs, and displays a control interface of the target controlled device on the control device. Therefore, a problem that a user needs to autonomously select a controlled device is avoided. It is implemented that one control device may determine, according to a received strength of a signal transmitted back by a controlled device, whether the control device directs to the controlled device. According to an operation habit of controlling, by people, a device by using a remote controller, when a user directs the control device to a controlled device, it represents that the user wants to control the controlled device; therefore, in this embodiment of the present invention, by means of determining whether the control device directs to the controlled device, a device that the user wants to control is identified based on the short range wireless communications technology, and a target controlled device is selected from multiple controlled devices, thereby improving user experience effect.

An embodiment of the present invention further provides a system for selecting a controlled device. The system uses the method for selecting a controlled device, and includes the control device, shown in FIG. 6, for selecting a controlled device, and at least one controlled device. In this system, the control device acquires a first signal received strength in a direct path mode and a second signal received strength in a multipath mode of each controlled device of the at least one controlled device; obtains a signal received strength ratio of each controlled device according to the first signal received strength and the second signal received strength of each controlled device; determines, according to the signal received strength ratio of each controlled device and a preset signal received strength ratio corresponding to the controlled device, whether the control device directs to the corresponding controlled device; and determines a target controlled device from the controlled device to which the control device directs, and displays a control interface of the target controlled device on the control device. Therefore, a problem that a user needs to autonomously select a controlled device is avoided. It is implemented that one control device may determine, according to a received strength of a signal transmitted back by a controlled device, whether the control device directs to the controlled device. According to an operation habit of controlling, by people, a device by using a remote controller, when a user directs the control device to a controlled device, it represents that the user wants to control the controlled device; therefore, in this embodiment of the present invention, by means of determining whether the control device directs to the controlled device, a device that the user wants to control is identified based on the short range wireless communications technology, and a target controlled device is selected from multiple controlled devices, thereby improving user experience effect.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method for selecting a controlled device, applied to a wireless network that comprises one control device and at least one controlled device, wherein the control device executes the following method:
   acquiring a first signal received strength in a direct path mode and a second signal received strength in a multipath mode of each of the at least one controlled device;
   obtaining a signal received strength ratio of each controlled device according to the first signal received strength and the second signal received strength of each of the at least one controlled device;
   determining, according to the signal received strength ratio of each of the at least one controlled device and a preset signal received strength ratio corresponding to the controlled device, whether the control device directs to a corresponding controlled device; and
   determining a target controlled device from the controlled device to which the control device directs, and displaying a control interface of the target controlled device on the control device.

2. The method for selecting a controlled device according to claim 1, wherein before the acquiring a first signal received strength in a direct path mode and a second signal received strength in a multipath mode of each of the at least one controlled device, the method further comprises:
   acquiring a current wireless channel environment model of the wireless network;
   generating, according to the current wireless channel environment model, a tap coefficient in a direct path mode and a tap coefficient in a multipath mode of a channel equalizer of each of the at least one controlled device in the wireless network; and
   separately sending the tap coefficient in a direct path mode and the tap coefficient in a multipath mode of the channel equalizer of each of the at least one controlled device to a corresponding controlled device, so that each controlled device obtains the first signal received strength through calculation according to the tap coefficient in a direct path mode of the channel equalizer of the controlled device and obtains the second signal received strength through calculation according to the tap coefficient in a multipath mode of the channel equalizer of the controlled device.

3. The method for selecting a controlled device according to claim 1, wherein the acquiring a first signal received strength in a direct path mode of device of the at least one controlled device comprises:
   broadcasting data to the at least one controlled device, and sending a request packet to each of the at least one controlled device; and
   receiving a response packet sent by each of the at least one controlled device, wherein the response packet comprises the first signal received strength of the controlled device.

4. The method for selecting a controlled device according to claim 1, wherein the acquiring a second signal received strength in a multipath mode of each of the at least one controlled device comprises:
   broadcasting data to the at least one controlled device, and sending a request packet to each of the at least one controlled device; and
   receiving a response packet sent by each of the at least one controlled device, wherein the response packet comprises the second signal received strength of the controlled device.

5. The method for selecting a controlled device according to claim 1, wherein the acquiring a first signal received strength in a direct path mode of each of the at least one controlled device comprises:
   broadcasting data to the at least one controlled device for multiple times; and
   acquiring multiple signal received strengths corresponding to a direct path mode of each controlled device, and performing weighting processing on the multiple signal received strengths corresponding to the multipath mode of each controlled device, to obtain the first signal received strength; and
   the acquiring a second signal received strength in a multipath mode of each of the at least one controlled device comprises:
   broadcasting data to the at least one controlled device for multiple times; and
   acquiring multiple signal received strengths corresponding to a multipath mode of each controlled device, and performing weighting processing on the multiple signal received strengths corresponding to the direct path mode of each controlled device, to obtain the second signal received strength.

6. The method for selecting a controlled device according to claim 1, wherein
   the signal received strength ratio of each controlled device is a ratio of the first signal received strength to the second signal received strength of each of the at least one controlled device; and the determining, according to the signal received strength ratio of each of the at least one controlled device and a preset signal received strength ratio corresponding to the controlled device, whether the control device directs to the corresponding controlled device comprises: when the signal received strength ratio of each controlled device is greater than the preset signal received strength ratio corresponding to the controlled device, determining that the control device directs to the controlled device; otherwise, determining that the control device does not direct to the controlled device; or
   the signal received strength ratio of each controlled device is a ratio of the second signal received strength to the first signal received strength of each of the at least one controlled device; and the determining, according to the signal received strength ratio of each of the at least one controlled device and a preset signal received strength ratio corresponding to the controlled device, whether the control device directs to the corresponding controlled device comprises: when the signal received strength ratio of each controlled device is less than the preset signal received strength ratio corresponding to the controlled device, determining that the control device directs to the controlled device; otherwise, determining that the control device does not direct to the controlled device.

7. The method for selecting a controlled device according to claim 1, wherein the determining a target controlled device from the controlled device to which the control device directs comprises:

when it is determined that the control device directs to only one controlled device, determining that the directed to controlled device is the target controlled device;

when it is determined that the control device directs to two controlled devices, sending prompt information to instruct a user to select the target controlled device, and selecting one controlled device from the two controlled devices as the target controlled device according to a processing instruction of the user; and when it is determined that the control device directs to more than two controlled devices, re-executing the method for selecting a controlled device, or sending prompt information to instruct a user to select the target controlled device, and selecting one controlled device from the more than two controlled devices as the target controlled device according to a processing instruction of the user.

8. A control device for selecting a controlled device, applied to a wireless network that comprises one control device and at least one controlled device, wherein the control device comprises a short range wireless communications chip, a central processor, a display component, and an interface, and the short range wireless communications chip communicates with the central processor by using a bus and the interface, wherein the short range wireless communications chip is configured to acquire a first signal received strength in a direct path mode and a second signal received strength in a multipath mode of each of the at least one controlled device;

the central processor is configured to obtain a signal received strength ratio of each controlled device according to the first signal received strength and the second signal received strength of each of the at least one controlled device;

the central processor is configured to determine, according to the signal received strength ratio of each of the at least one controlled device and a preset signal received strength ratio corresponding to the controlled device, whether the control device directs to the corresponding controlled device;

the central processor is configured to determine which controlled device to which the control device directs is a target controlled device; and the display component is configured to display a control interface of the target controlled device.

9. The control device for selecting a controlled device according to claim 8, wherein before acquiring the first signal received strength in a direct path mode and the second signal received strength in a multipath mode of each of the at least one controlled device, the short range wireless communications chip is further configured to acquire a current wireless channel environment model of the wireless network;

the central processor is configured to generate, according to the current wireless channel environment model, a tap coefficient in a direct path mode and a tap coefficient in a multipath mode of a channel equalizer of each of the at least one controlled device in the wireless network; and the short range wireless communications chip is configured to separately send the tap coefficient in a direct path mode and the tap coefficient in a multipath mode of the channel equalizer of each of the at least one controlled device to a corresponding controlled device, so that each controlled device obtains the first signal received strength through calculation according to the tap coefficient in a direct path mode of the channel equalizer of the controlled device and obtains the second signal received strength through calculation according to the tap coefficient in a multipath mode of the channel equalizer of the controlled device.

10. The control device for selecting a controlled device according to claim 8, wherein that the short range wireless communications chip is configured to acquire a first signal received strength in a direct path mode of each of the at least one controlled device comprises:

the short range wireless communications chip is configured to broadcast data to the at least one controlled device, send a request packet to the at least one controlled device, and receive a response packet sent by each of the at least one controlled device, wherein the response packet comprises the first signal received strength of the controlled device.

11. The control device for selecting a controlled device according to claim 8, wherein that the short range wireless communications chip is configured to acquire a second signal received strength in a multipath mode of each of the at least one controlled device comprises:

the short range wireless communications chip is configured to broadcast data to the at least one controlled device, send a request packet to the at least one controlled device, and receive a response packet sent by each of the at least one controlled device, wherein the response packet comprises the second signal received strength of the controlled device.

12. The control device for selecting a controlled device according to claim 8, wherein that the short range wireless communications chip is configured to acquire a first signal received strength in a direct path mode of each of the at least one controlled device comprises:

the short range wireless communications chip is configured to broadcast data to the at least one controlled device multiple times, acquire multiple signal received strengths corresponding to a direct path mode of each controlled device, and perform weighting processing on the multiple signal received strengths corresponding to the direct path mode of each controlled device, to obtain the first signal received strength; and that the short range wireless communications chip is configured to acquire a second signal received strength in a multipath mode of each controlled device of the at least one controlled device comprises: the short range wireless communications chip is configured to broadcast data to the at least one controlled device multiple times, acquire multiple signal received strengths corresponding to a multipath mode of each controlled device, and perform weighting processing on the multiple signal received strengths corresponding to the multipath mode of each controlled device, to obtain the second signal received strength.

13. The control device for selecting a controlled device according to claim 8, wherein the signal received strength ratio of each controlled device is a ratio of the first signal received strength to the second signal received strength of each controlled device of the at least one controlled device; and that the central processor is configured to determine, according to the signal received strength ratio of each controlled device of the at least one controlled device and a preset signal received strength ratio corresponding to the controlled device, whether the control device directs to the corresponding controlled device comprises: when the signal received strength ratio of each controlled device is greater than the preset signal received strength ratio corresponding to the controlled device, determining that the control device directs to the controlled device; otherwise, determining that the control device does not direct to the controlled device; or the signal received strength ratio of each controlled device is a ratio of the second signal received strength to the first signal received strength of each controlled device of the at least one controlled device; and that the central processor is configured to determine, according to the signal received strength ratio of each controlled device of the at least one controlled device and a preset signal received strength ratio corresponding to the controlled device, whether the control device directs to the corresponding controlled device comprises: when the signal received strength ratio of each controlled device is less than the preset signal received strength ratio corresponding to the controlled device, determining that the control device directs to the controlled device; otherwise, determining that the control device does not direct to the controlled device.

14. The control device for selecting a controlled device according to claim 8, wherein that the central processor is configured to determine a target controlled device from the controlled device to which the control device directs comprises:

when it is determined that the control device directs to only one controlled device, determining that the directed to controlled device is the target controlled device; or when it is determined that the control device directs to two controlled devices, sending prompt information to instruct a user to select the target controlled device, and selecting one controlled device from the two controlled devices as the target controlled device according to a processing instruction of the user; or when it is determined that the control device directs to more than two controlled devices, re-executing the method for selecting a controlled device, or sending prompt information to instruct a user to select the target controlled device, and selecting one controlled device from the more than two controlled devices as the target controlled device according to a processing instruction of the user.

* * * * *

UNITED STATES PATENT AND TRADEMARK OFFICE
CERTIFICATE OF CORRECTION

PATENT NO. : 9,715,824 B2
APPLICATION NO. : 15/033092
DATED : July 25, 2017
INVENTOR(S) : Yunsheng Kuang It is certified that error appears in the above-identified patent and that said Letters Patent is hereby corrected as shown below:

In the Specification

Column 23, Line 23, "controlled device for" should read -- controlled device --.

In the Claims

Column 32, Line 12, "controlled device for" should read -- controlled device --.

Signed and Sealed this
Twentieth Day of February, 2018

Andrei Iancu
*Director of the United States Patent and Trademark Office*